W. O. SMITH.
ADJUSTABLE GARDEN HOSE SUPPORTER.
APPLICATION FILED FEB. 29, 1912.
1,046,033.
Patented Dec. 3, 1912.
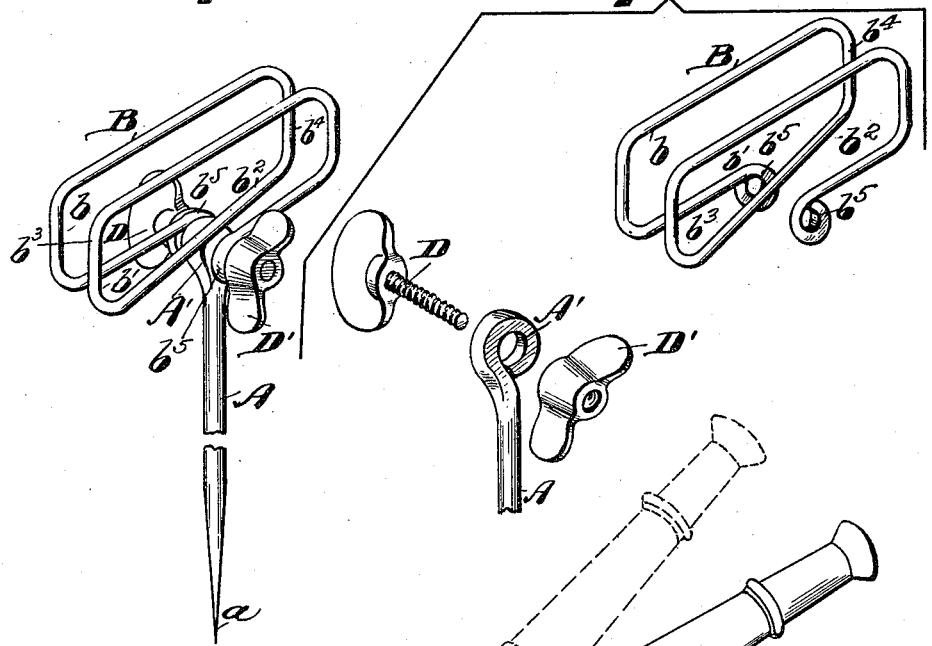
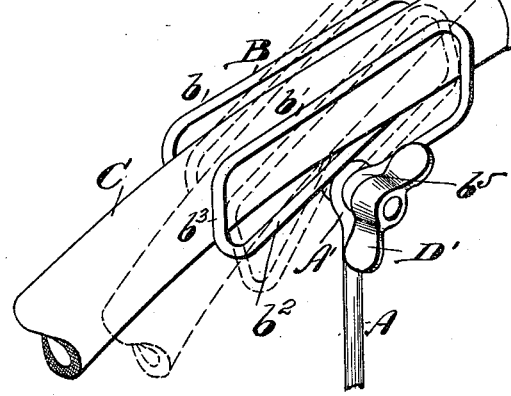
Witnesses
Grace E. Wynkoop.
Roy Coole.
Inventor
William O. Smith
By J. E. Thomas
Attorney

UNITED STATES PATENT OFFICE.

WILLIAM O. SMITH, OF OXFORD, MICHIGAN.

ADJUSTABLE GARDEN-HOSE SUPPORTER.

1,046,033.

Specification of Letters Patent. Patented Dec. 3, 1912.

Application filed February 29, 1912. Serial No. 680,595.

*To all whom it may concern:*

Be it known that I, WILLIAM O. SMITH, a citizen of the United States, residing at Oxford, county of Oakland, State of Michigan, have invented a certain new and useful Improvement in Adjustable Garden-Hose Supporters, and declare the following to be a full, clear, and exact description of the same, such as will enable others skilled in the art to which it pertains to make and use the same, reference being had to the accompanying drawings, which form a part of this specification.

My invention relates to an improvement in an adjustable garden hose supporter, shown in the accompanying drawings and more particularly set forth in the following specification and claims.

The object of my invention is to provide a simple, cheap, and effective device adapted to support the nozzle of a garden hose at any desired angle for spraying or other like purposes.

Other advantages and improvements will hereafter appear.

In the drawings accompanying this specification:—Figure 1 is a perspective view of the device with a portion of the supporting standard broken away for convenience in locating the several views upon the sheet. Fig. 2 shows perspective views of the several parts of the device as they appear before being assembled. Fig. 3 is a perspective view of the device supporting the nozzle end of a hose and in dotted lines the device adjusted to support the hose at a different angle.

Referring now to the letters of reference placed upon the drawings:—A is a supporting rod or standard having a pointed end $a$ to adapt it to readily enter the ground; its upper end being formed with an eye A'.

B is an elastic hose clamp formed of a single piece of wire bent to form two substantially rectangular frames $b$ and $b'$ spaced apart to receive and embrace the hose C; the rectangular frames being connected by a diagonally bent portion $b^2$ to provide an elastic relation between the portions $b$ and $b'$ through the torsion of the vertical members $b^3$ and $b^4$. The ends of the clamp are bent to form eyes $b^5$, $b^5$, to receive a supporting bolt or thumb-screw D, engaging the clamp to the eye A' of the standard.

In assembling the parts the eye A' of the standard is lodged between the eyes $b^5$ of the clamp, the thumb-screw or bolt D is then inserted through the eyes $b^5$, $b^5$, of the clamp and the eye A' of the standard. The bat-wing nut D' is then engaged with the bolt D and adjusted thereon so as to force the eyes $b^5$ of the clamp in impinging relation with the eye A' of the standard.

It will now be obvious that upon tightening the nut, the hose clamp may be secured in any position required, thereby supporting the hose nozzle at the angle desired when held by the clamping member. By turning the standard in the ground the hose may be adjusted to any radius and the water projected in any direction desired.

Having thus described my invention, what I claim is:—

1. In a device of the character described, a standard its upper end being formed with an eye to support a hose clamping element, an elastic hose clamping element formed of wire, its ends having eyes spaced apart to receive between them the eyes of the standard, the intermediate portion of the clamping element being formed into two substantially rectangular frames spaced apart but connected by a portion of said member adapted to maintain said frames in elastic relation to each other whereby a hose inserted between the frames may be securely held, a bolt projecting through the eyes of the frames and standard, and a nut engaging said bolt to secure the clamping element in any desired position.

2. In a device of the character described, a standard adapted at one end for entry in the ground, its upper end being formed with an eye to support a hose clamping element, an elastic hose clamping element formed of wire, its end having eyes spaced apart to receive between them the eye of the standard, the intermediate portion of the clamping element being formed into two substantially rectangular frames spaced apart but connected by a portion of said member leading diagonally from one frame to the other whereby an elastic relation between the frames is maintained to adapt them to receive and embrace a hose, a bolt projecting through the eyes of the frames and standard, and a nut engaging the bolt to secure the clamping element in any desired position.

In testimony whereof, I sign this specification in the presence of two witnesses.

WILLIAM O. SMITH.

Witnesses:
   GRACE E. WYNKOOP,
   SAMUEL E. THOMAS.

Copies of this patent may be obtained for five cents each, by addressing the "Commissioner of Patents, Washington, D. C."